(12) United States Patent
Ito et al.

(10) Patent No.: US 9,686,963 B2
(45) Date of Patent: Jun. 27, 2017

(54) WATER ABSORBING MATERIAL

(71) Applicant: DAIKI CO., LTD., Tokyo (JP)

(72) Inventors: Hiroshi Ito, Tokyo (JP); Shinobu Hatanaka, Tokyo (JP); Junji Yoshinaga, Tokyo (JP)

(73) Assignee: DAIKI CO., LTD., Tokyo (JP)

(*) Notice: Subject to any disclaimer, the term of this patent is extended or adjusted under 35 U.S.C. 154(b) by 0 days.

(21) Appl. No.: 15/347,522

(22) Filed: Nov. 9, 2016

(65) Prior Publication Data

US 2017/0055485 A1 Mar. 2, 2017

Related U.S. Application Data

(60) Division of application No. 14/608,952, filed on Jan. 29, 2015, which is a continuation of application No. PCT/JP2012/076148, filed on Oct. 9, 2012.

(51) Int. Cl.
| | |
|---|---|
| *A01K 1/015* | (2006.01) |
| *B01J 20/22* | (2006.01) |
| *B01J 20/24* | (2006.01) |
| *B01J 20/26* | (2006.01) |
| *B01J 20/28* | (2006.01) |
| *B01J 20/30* | (2006.01) |
| *B01J 20/32* | (2006.01) |
| *B65B 1/04* | (2006.01) |
| *B65B 31/00* | (2006.01) |

(52) U.S. Cl.
CPC ............. *A01K 1/0155* (2013.01); *B01J 20/22* (2013.01); *B01J 20/24* (2013.01); *B01J 20/26* (2013.01); *B01J 20/261* (2013.01); *B01J 20/28016* (2013.01); *B01J 20/3028* (2013.01); *B01J 20/3206* (2013.01); *B01J 20/3268* (2013.01); *B65B 1/04* (2013.01); *B65B 31/00* (2013.01)

(58) Field of Classification Search
CPC ............................... A01K 1/0155; B01J 20/22
See application file for complete search history.

(56) References Cited

U.S. PATENT DOCUMENTS

| | | | | |
|---|---|---|---|---|
| 4,326,481 A | * | 4/1982 | Gruss | A01K 1/0107 119/171 |
| 4,444,148 A | | 4/1984 | Lander | |
| 4,471,717 A | | 9/1984 | Lander | |
| 5,714,445 A | * | 2/1998 | Trinh | A61K 8/0208 502/401 |

(Continued)

FOREIGN PATENT DOCUMENTS

| | | |
|---|---|---|
| CN | 1762209 A | 4/2006 |
| JP | 2000-060338 A | 2/2000 |

(Continued)

OTHER PUBLICATIONS

Jan. 8, 2013 International Written Opinion issued in International Patent Application No. PCT/JP2012/076148.

(Continued)

*Primary Examiner* — Joseph D Anthony
(74) *Attorney, Agent, or Firm* — Oliff PLC

(57) ABSTRACT

A water absorbing material that is suitable for being discarded by being flushed down a flush toilet is provided. The water absorbing material includes only an organic substance containing no nutrients.

5 Claims, 1 Drawing Sheet

(56) References Cited

U.S. PATENT DOCUMENTS

| | | | |
|---|---|---|---|
| 5,733,272 A * | 3/1998 | Brunner | A61K 8/0208 424/688 |
| 6,287,550 B1 * | 9/2001 | Trinh | A01K 1/0152 119/171 |
| 6,619,233 B1 | 9/2003 | Mochizuki | |
| 7,510,988 B2 * | 3/2009 | Wada | A61L 15/46 428/206 |
| 2002/0041860 A1 * | 4/2002 | Requejo | A61L 9/012 424/76.1 |
| 2003/0020199 A1 * | 1/2003 | Kajikawa | B29B 9/12 264/140 |
| 2003/0196606 A1 | 10/2003 | Mochizuki | |
| 2004/0081829 A1 * | 4/2004 | Klier | A61L 15/16 428/394 |
| 2005/0004541 A1 * | 1/2005 | Roberts | B32B 5/28 604/367 |
| 2005/0049565 A1 * | 3/2005 | Joseph | A61F 13/539 604/367 |
| 2006/0058770 A1 * | 3/2006 | Bohlen | A61F 13/55145 604/385.201 |
| 2007/0065397 A1 | 3/2007 | Ito et al. | |
| 2007/0179466 A1 * | 8/2007 | Tremblay | A61F 13/55145 604/385.02 |
| 2008/0075937 A1 * | 3/2008 | Wada | A61L 15/46 428/212 |
| 2008/0125533 A1 * | 5/2008 | Riegel | A61L 15/60 524/417 |
| 2008/0161499 A1 | 7/2008 | Riegel et al. | |
| 2008/0200331 A1 * | 8/2008 | Daniel | A61L 15/60 502/402 |
| 2009/0062760 A1 * | 3/2009 | Wright | A61F 13/15723 604/367 |
| 2009/0161499 A1 * | 6/2009 | Aikoh | G11B 7/08582 369/13.33 |
| 2010/0240808 A1 * | 9/2010 | Wada | B01J 20/261 524/78 |
| 2010/0318049 A1 * | 12/2010 | Meyer | A61F 13/53 604/366 |
| 2015/0137035 A1 * | 5/2015 | Ito | A01K 1/0155 252/194 |

FOREIGN PATENT DOCUMENTS

| | | |
|---|---|---|
| JP | 2003-134953 A | 5/2003 |
| JP | 2007-190025 A | 8/2007 |
| JP | 2009-000087 A | 1/2009 |
| JP | 2009-153468 A | 7/2009 |

OTHER PUBLICATIONS

Jan. 8, 2013 International Search Report issued in International Patent Application No. PCT/JP2012/076148.

Jul. 8, 2016 Office Action issued in Japanese Application No. 2014-540652.

* cited by examiner

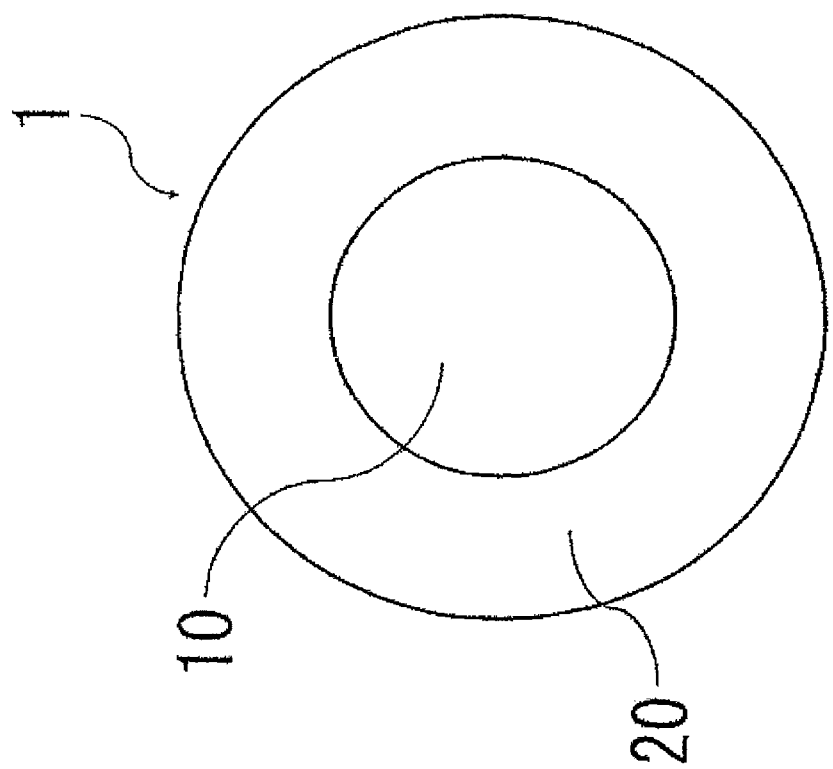

WATER ABSORBING MATERIAL

CROSS REFERENCE TO RELATED APPLICATION

This is a Divisional of U.S. application Ser. No. 14/608,952, filed Jan. 29, 2015 now abandoned, which is a Continuation of International Application No. PCT/JP2012/076148 filed Oct. 9, 2012. The contents of this application are hereby incorporated by reference in their entirety.

TECHNICAL FIELD

The present invention relates to a water absorbing material for absorbing liquids such as urine of humans or animals.

BACKGROUND ART

Patent Literature 1 describes an excrement treatment material for animals that is a type of water absorbing material. An organic substance such as extraction residue of roasted coffee beans is used as a constituent material for this excrement treatment material.
Patent Literature 1: JP 2007-190025A

SUMMARY OF INVENTION

Technical Problem

Incidentally, when used water absorbing materials need to be discarded, examples of the discarding method include a method in which the used water absorbing materials are discarded by being flushed down a flush toilet as well as a method for discarding them as so-called household garbage. The discarding method in which the used water absorbing materials are flushed down a flush toilet is very convenient for users.
The water absorbing material flushed down a flush toilet is treated in a septic tank that is connected to the toilet. The septic tank has a function of cleaning sewage by the cleaning action of microorganisms. However, the organic substances in the water absorbing materials sometimes adversely affect the microorganisms in the septic tank. Specifically, the organic substances in the water absorbing materials sometimes cause an abnormal increase and decrease in the number of specific microorganisms. This causes an impairment of the function of the septic tank.

Solution to Problem

The present invention was made in view of the problems described above, and it is an object thereof to provide a water absorbing material that is suitable for being discarded by being flushed down a flush toilet.
As a result of intensive research, the inventors of the present invention found that nutrients contained in the organic substances have a significant influence on the microorganisms in the septic tank, and the present invention was achieved. That is, a water absorbing material according to the present invention includes only an organic substance containing no nutrients.
The water absorbing material includes an organic substance, but contains no nutrients. Therefore, even when the water absorbing material is flushed down a flush toilet, it is possible to minimize the influence on the microorganisms in the septic tank.

Advantageous Effects of the Invention

With the present invention, a water absorbing material that is suitable for being discarded by being flushed down a flush toilet is realized.

BRIEF DESCRIPTION OF DRAWINGS

FIG. 1 is a schematic view of an embodiment of a water absorbing material according to the present invention.

DESCRIPTION OF EMBODIMENTS

Hereinafter, an embodiment of the present invention will be described in detail with reference to the drawing.

Configuration

FIG. 1 is a schematic view of an embodiment of a water absorbing material according to the present invention. A water absorbing material 1 is an excrement treatment material for a pet animal such as a dog or a cat, and includes a granular core portion 10 and a coating layer portion 20. The coating layer portion 20 covers the granular core portion 10. In this embodiment, the coating layer portion 20 covers the entire surface of the granular core portion 10.

The water absorbing material 1 includes only an organic substance containing no nutrients. That is, a material constituting the granular core portion 10 (core portion material) and a material constituting the coating layer portion 20 (coating material) are limited to organic substances containing no nutrients.

Here, the nutrients refer to a protein, carbohydrate, dietary fiber, lipid, saturated fatty acid, n-6 fatty acid, n-3 fatty acid, cholesterol, saccharide, vitamin A, vitamin D, vitamin E, vitamin K, vitamin $B_1$, vitamin $B_2$, niacin, vitamin $B_6$, vitamin $B_{12}$, folic acid, pantothenic acid, biotin, vitamin C, potassium, calcium, magnesium, phosphorus, iron, zinc, copper, manganese, iodine, selenium, chromium, molybdenum, and sodium.

<Granular Core Portion 10>

It is sufficient that the granular core portion 10 is formed in a pellet shape, and the granular core portion 10 does not have to have a perfectly spherical shape or the like. The granular core portion 10 may, for example, have a columnar (elongated) shape, a flat shape, or the like. Moreover, as described above, an organic substance containing no nutrients is used as the core portion material. Examples of the organic substances include papers, plastics, CMC (carboxymethyl cellulose), PVA (polyvinyl alcohol), and sodium polyacrylate. A plurality of materials may be used in combination.

Various waste materials and the like as well as virgin pulp can be used as the papers. Examples thereof include thin paper waste, sanitary paper waste, toilet paper waste, tissue paper waste, facial paper waste, cleaning paper waste, cellulose wadding waste, paper towel waste, toilet seat paper waste, newspaper scraps, magazine scraps, buffing powder (fine paper powder mainly generated when books are cut or shaved during bookbinding in printing companies), mechanical pulp waste, chemical pulp waste, titanium paper waste, semi-chemical pulp waste, cotton-like pulp waste, wood pulp waste, pulverized products of waste paper pulp, fluff pulp, water absorbing fiber waste, nonwoven fabric waste, paper powder generated in nonwoven fabric production, paper powder generated in a papermaking process, paper powder generated in sanitary material production, laminated paper waste, printing scraps of laminated paper, edge scraps of laminated paper, cardboard scraps, waste paper (trim loss generated in sanitary material manufacturers, paper scraps generated in paper manufacturers, and the like), wrapping paper, paperboard, used tickets, and punched-out scraps.

Examples of the plastics include solid synthetic macromolecular compounds (e.g., polypropylene, vinyl chloride, polychlorinated biphenyl, polystyrene, polyacetal, polycarbonate, polyethylene, polyamide, polyethylene telephthalate, vinylidene chloride, acrylic resin, polyurethane (urethane foam), and biodegradable plastics). Various waste materials may be used as the plastics. Examples thereof include plastic waste, polyurethane waste, styrol waste (including styrene foam), agricultural film waste, waste of various synthetic resin packing materials, photographic film waste, waste of plastic containers, waste of coating of electric wires, waste of linings, polymer waste, paint waste, and baekeland waste (e.g., printed circuit boards).

Also, plastic-rich products separated from waste of excrement treatment materials, plastic-rich products separated from paper diaper waste (e.g., exterior bodies of defective paper diapers produced by sanitary material manufacturers), plastic-rich products separated from sanitary napkin waste, plastic-rich products separated from breast pad waste, plastic-rich products separated from sweat pad waste, plastic-rich products separated from incontinence pad waste, plastic-rich products separated from animal sheet waste, plastic-rich products separated from the waste of sheets for bedding by classification or the like, plastic-rich products separated from mask waste, plastic-rich products separated from eye mask waste, plastic-rich products separated from the waste of head covers for seats, waste of vinyl chloride wall papers, plastic-rich products separated from pillowcase waste, waste of synthetic resin fiber, or the like can be used.

<Coating Layer Portion 20>

The coating layer portion 20 has a function of causing the water absorbing materials 1, which absorbed liquid such as urine, to adhere to each other so as to form an aggregate. A mixture of an adhesive material and paper powder can be used as the coating material, for example. However, the coating material is limited to organic substances containing no nutrients.

Various known materials can be used as the adhesive material as long as they are organic substances containing no nutrients. Examples thereof include PVA and sodium polyacrylate. A plurality of materials may be used in combination.

Examples of the paper powder include thin paper, thin paper waste, sanitary paper, sanitary paper waste, toilet paper, toilet paper waste, tissue paper, tissue paper waste, facial paper, facial paper waste, cleaning paper, cleaning paper waste, cellulose wadding, cellulose wadding waste, paper towel, paper towel waste, toilet seat paper waste, mechanical pulp, mechanical pulp waste, chemical pulp, chemical pulp waste, semi-chemical pulp, semi-chemical pulp waste, cotton-like pulp, cotton-like pulp waste, wood pulp, wood pulp waste, pulverized products of waste paper pulp, fluff pulp, water absorbing fiber waste, paper powder including a water absorbing resin, paper powder generated in a bookbinding process, paper powder generated in nonwoven fabric production, paper powder generated in a papermaking process, and paper powder generated in sanitary material production. A plurality of materials may be used in combination. All of the foregoing materials are pulverized to granules preferably with a grain size of 0.5 mm or less, and more preferably 0.3 mm or less, for use.

Functional Effects

The water absorbing material 1 includes an organic substance, but contains no nutrients. Therefore, even when the water absorbing material 1 is flushed down a flush toilet, it is possible to minimize the influence on the microorganisms in the septic tank. Accordingly, the water absorbing material 1 that is suitable for being discarded by being flushed down a flush toilet is realized.

On the other hand, it is thought that no organic substances are used as materials for a water absorbing material in order to minimize the influence on the microorganisms in the septic tank. However, this causes a problem in that a range of the selection of materials is significantly narrowed.

In this regard, in this embodiment, only organic substances containing no nutrients are selected from known organic substances and are used, and thus the water absorbing material 1 that is suitable for being discarded by being flushed down a flush toilet is realized without excessively narrowing a range of the selection of materials. This is based on the finding of the inventors of the present invention that nutrients contained in the organic substances have a significant influence on the microorganisms in the septic tank.

Production Method

An example of a method for producing the water absorbing material 1 will be described. This production method includes a granulation step, a coating step, a classification step, and a drying step.

In the granulation step, the core portion materials are pulverized with a crusher so as to have a predetermined size, and the pulverized core portion materials are placed in a mixer and mixed with predetermined proportions. Then, the core portion materials are subjected to extrusion granulation using a granulator after adding water thereto, and thus the granular core portions 10 are formed.

In the coating step, the coating layer portion 20 is formed by sprinkling or spraying the coating materials around the granular core portion 10 using a coating device or the like.

In the classification step, only the water absorbing materials that meet a predetermined standard are obtained by sifting the water absorbing materials manufactured in the preceding step with a sieve having a predetermined mesh size.

In the drying step, the water absorbing materials obtained in the preceding step are dried using a dryer. If the moisture content of the granular core portion 10 is too high, the moisture causes the growth of mold and the like during storage of the water absorbing material 1. It is possible to prevent the growth of mold and the like by drying the water absorbing materials and adjusting the moisture content as appropriate.

It should be noted that a scent addition step may be performed after the drying step. In this step, scent is placed in a packaging bag to be used in packaging of the water absorbing materials 1. However, the scent is limited to organic substances containing no nutrients. The scent is injected into a packaging bag together with air, for example. Air is injected in order to expand the packaging bag. It is preferable to perform this step prior to a step of packaging the water absorbing materials 1 in a packaging bag (packaging step).

The above-described scent adheres to the water absorbing material 1 in the packaging bag, and thus an aromatic water absorbing material 1 can be obtained. It is possible to prevent the scent from adhering to a production device in the previous steps by placing the scent in the packaging bag in this manner. Accordingly, it becomes easy to clean the device after production.

In the case where the scent is injected into a packaging bag together with air, there is no need to provide a device for placing the scent in a packaging bag in addition to a device for injecting air into the packaging bag. Therefore, it is possible to obtain the aromatic water absorbing material 1 while avoiding the complication of the production equipment.

In the case where the scent addition step is performed prior to the packaging step, it is possible to package the water absorbing material 1 in a state in which the scent spreads over the entire portion in a packaging bag. This makes it easy for the scent to uniformly adhere to a plurality of water absorbing materials 1 in the packaging bag.

Furthermore, since the scent is injected into a packaging bag, it is possible to reduce the amount of the scent that are wasted compared with a case where the scent is injected outside a packaging bag (i.e., a case where the scent is injected into the water absorbing materials 1 before being packaged in a packaging bag).

Another Embodiment of the Present Invention

A water absorbing material according to the present invention is not limited to the above-described embodiment, and various modifications can be made. For example, in the above-described embodiment, the example in which the water absorbing material 1 has a multilayer structure including the granular core portion 10 and the coating layer portion 20 is used. However, the coating layer portion 20 is not necessarily provided. That is, the water absorbing material may have a single-layer structure.

REFERENCE SIGNS LIST

1 Water absorbing material
10 Granular core portion
20 Coating layer portion

The invention claimed is:

1. A method for producing a packaged granular excrement treatment material comprising:
   a step of forming granular excrement treatment material adapted for absorbing excrement of a pet animal and including only organic substances containing no nutrients, the granular excrement treatment material not including papers;
   a step of packaging the granular excrement treatment material in a packaging bag;
   a step of placing a scent in the packaging bag, the scent being an organic substance containing no nutrients; and
   a step of injecting air into the packaging bag in order to expand the packaging bag,
   wherein the scent is placed in the packaging bag by being injected into the packaging bag together with the air.

2. The method according to claim 1, wherein the granular excrement treatment material comprises a granular core portion and a coating layer portion covering the granular core portion.

3. The method according to claim 1, wherein the granular excrement treatment material has a single-layer structure.

4. The method according to claim 1, wherein the scent adheres to the granular excrement treatment material.

5. The method according to claim 1, wherein the granular excrement treatment material is at least one material selected from the group consisting of plastics, carboxymethyl cellulose, polyvinyl alcohol, and sodium polyacrylate.

* * * * *